US009807483B1

(12) United States Patent
Edson

(10) Patent No.: US 9,807,483 B1
(45) Date of Patent: Oct. 31, 2017

(54) MOBILE DEVICE CASE WITH FOLDABLE SPEAKER SYSTEM

(71) Applicant: BassCase LLC, Kenilworth, IL (US)

(72) Inventor: Thomas J. Edson, Kenilworth, IL (US)

( * ) Notice: Subject to any disclaimer, the term of this patent is extended or adjusted under 35 U.S.C. 154(b) by 0 days.

(21) Appl. No.: 15/371,823

(22) Filed: Dec. 7, 2016

(51) Int. Cl.
*H04M 1/00* (2006.01)
*H04R 1/02* (2006.01)
*A45C 11/00* (2006.01)

(52) U.S. Cl.
CPC .............. *H04R 1/025* (2013.01); *A45C 11/00* (2013.01); *A45C 2011/001* (2013.01); *A45C 2011/002* (2013.01); *A45C 2011/003* (2013.01); *H04R 2499/11* (2013.01)

(58) Field of Classification Search
CPC . H04R 2499/05; H04R 2499/11; H04R 1/025
USPC ..................... 455/571.8, 571.1–571.7, 550.1
See application file for complete search history.

(56) References Cited

U.S. PATENT DOCUMENTS

| | | | |
|---|---|---|---|
| 5,517,683 A | 5/1996 | Collett et al. | |
| 5,768,371 A | 6/1998 | Snyder | |
| 6,184,654 B1 | 2/2001 | Bachner, III et al. | |
| 7,400,917 B2 | 7/2008 | Wood et al. | |
| D596,158 S | 7/2009 | Ragde, Jr. et al. | |
| 7,782,610 B2 | 8/2010 | Diebel et al. | |
| 7,859,222 B2 | 12/2010 | Woud | |
| 7,863,862 B2 | 1/2011 | Idzik et al. | |
| 8,013,572 B2 | 9/2011 | Rodgers | |
| 8,390,255 B1 | 3/2013 | Fathollahi | |
| 8,432,124 B2 | 4/2013 | Foster | |
| 8,825,124 B1 | 9/2014 | Davies et al. | |
| 8,954,117 B2 | 2/2015 | Huang | |
| 9,026,187 B2 | 5/2015 | Huang | |
| 9,226,057 B1 * | 12/2015 | Davis | H04R 1/026 |
| 2003/0096642 A1 | 5/2003 | Bessa et al. | |
| 2005/0181745 A1 * | 8/2005 | Wood | H04B 1/3888 455/90.3 |

(Continued)

FOREIGN PATENT DOCUMENTS

| | | |
|---|---|---|
| CH | 703177 A2 | 11/2011 |
| CN | 201252577 Y | 6/2009 |

(Continued)

OTHER PUBLICATIONS

Amazon.com; "EcoXpro Waterproof Case with Speaker and Waterproof Heads for Smartphones/MP3 Players" Product Description, 10 pages; Jun. 8, 2015.

(Continued)

*Primary Examiner* — Nay A Maung
*Assistant Examiner* — Angelica M Perez
(74) *Attorney, Agent, or Firm* — Ladas & Parry LLP

(57) ABSTRACT

A mobile device case is disclosed. The mobile device case includes a housing comprising a cavity configured to partially enclose a mobile device, a first and second foldable panel having first and second speakers pivotally connected to the housing, wherein the first and second foldable panels rotate from a folded position where the first and second foldable panels are configured to be folded on a back surface of the bottom surface of the cavity to an unfolded position where the first and second foldable panels extend laterally in a parallel way relative to the bottom surface of the cavity.

19 Claims, 10 Drawing Sheets

(56) References Cited

U.S. PATENT DOCUMENTS

| | | | | |
|---|---|---|---|---|
| 2008/0019550 | A1* | 1/2008 | Park | G06F 1/1616 381/333 |
| 2008/0123287 | A1 | 5/2008 | Rossell et al. | |
| 2008/0150367 | A1 | 6/2008 | Oh et al. | |
| 2010/0317413 | A1 | 12/2010 | Tan | |
| 2012/0088558 | A1 | 4/2012 | Song | |
| 2012/0308064 | A1 | 12/2012 | Matthews | |
| 2013/0069583 | A1 | 3/2013 | Lemelman et al. | |
| 2014/0141838 | A1 | 5/2014 | Cai et al. | |
| 2014/0167675 | A1 | 6/2014 | Armstrong et al. | |
| 2014/0187289 | A1 | 7/2014 | Cataldo et al. | |
| 2014/0262854 | A1* | 9/2014 | Chen | A45C 11/00 206/45.24 |
| 2015/0341712 | A1* | 11/2015 | Wilcox | H04R 7/045 381/332 |

FOREIGN PATENT DOCUMENTS

| | | | |
|---|---|---|---|
| DE | 202015101232 | U1 | 4/2015 |
| KR | 20140135899 | A | 11/2014 |
| KR | 101517801 | B1 | 5/2015 |
| WO | 2005/088844 | A1 | 9/2005 |

OTHER PUBLICATIONS

Malaria Gokey; Hands on: Peri Duo iPhone Case; Dec. 9, 2014, 4 pages; http://www.digitaltrends.com/mobile/peri-duo-iphone-case-hands-on/ Jun. 8, 2015.

Tom Keating; "iMainGo XP Portable Stero Speaker & Case for iPad Review", Nov. 29, 2011; VolP & Gadgets Blog.

* cited by examiner

MOBILE DEVICE CASE WITH FOLDABLE SPEAKER SYSTEM

BACKGROUND OF THE INVENTION

1. Field of the Invention

The present disclosure relates to a mobile device case. More specifically, it relates to a mobile device case having a speaker system.

2. Background

Mobile devices such as cellphones, smart phones, personal digital assistants (PDAs), portable media players (PMPs), mobile communication devices, handheld computing devices, ultra-mobile personal computers (UMPCs), and tablet computers are commonly used to listen to music or watch videos. However, users often times cannot enjoy the full range of sounds from the mobile device due to environmental conditions and other noise. Because the speaker system is embedded in the mobile device, the quality and capacity of the speaker system are generally limited due to the compact size of the device.

SUMMARY OF THE INVENTION

In an aspect of the disclosure, cases for a mobile device are provided. The case for a mobile device includes a housing comprising a cavity configured such that the mobile device is capable of being partially enclosed therein, the cavity having a bottom surface and an opening, a first foldable panel comprising a first speaker, pivotally connected to a first side of the housing, and a second foldable panel comprising a second speaker pivotally connected to a second side of the housing, wherein the first and second foldable panels rotate from a folded position where the first and second foldable panels are configured to be folded on a back surface of the bottom surface of the cavity and the first and second speakers face in an opposite direction to the bottom surface of the cavity to an unfolded position where the first and second foldable panels extend laterally away from the back surface of the bottom surface of the cavity.

In another aspect, a case for a mobile device includes a housing comprising a cavity configured such that the mobile device is capable of being partially enclosed therein, the cavity having a bottom surface and an opening, and the housing including at least one side having a hinge axis, and at least one foldable panel comprising a speaker pivotally connected to the at least one side of the housing, wherein the at least one foldable panel is configured to rotate about the hinge axis relative to a back surface of the bottom surface, wherein the at least one foldable panel rotates from a folded position where the at least one foldable panel is configured to be folded on the back surface of the bottom surface and the speaker faces in an opposite direction to the bottom surface of the cavity to an unfolded position where the at least one foldable panel extends laterally away from the back surface of the bottom surface of the cavity.

Advantages of the Invention

Several advantages of one or more aspects of the invention are that it provides for a versatile, easily-maintained, and compact structure for usage. Embodiments of the invention use a foldable panel having a speaker capable of being used when the case is folded into a compact closed position, and also capable of being used when the case is folded open so that the speakers are facing in a direction opposite to the closed position, therefore allowing for use in a variety of ways when the panel is folded and unfolded. Moreover, when the foldable panel is folded, the case minimizes the bulk for carriage and usage, therefore providing for an easily-maintained and compact structure.

BRIEF DESCRIPTION OF THE FIGURES (NON-LIMITING EMBODIMENTS OF THE DISCLOSURE)

Other advantages of the present invention will be readily appreciated, as the same becomes better understood by reference to the following detailed description when considered in connection with the accompanying drawings wherein.

DETAILED DESCRIPTION

Figure 1:
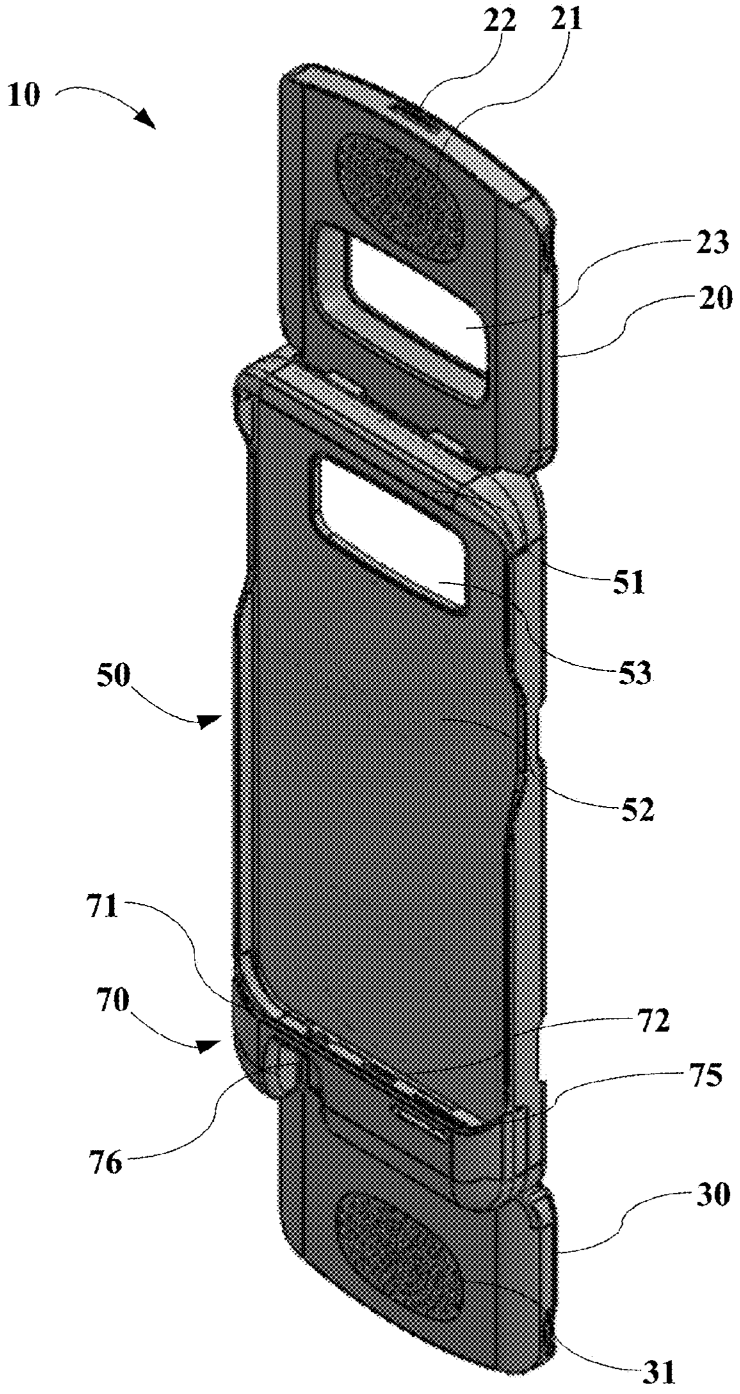
FIG. 1 is a perspective view of an embodiment of the present invention.

Reference will now be made to detailed embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, and components have not been described in detail so as not to unnecessarily obscure aspects of the embodiments.

In the following description of the invention, certain terminology is used for the purpose of reference only, and is not intended to be limiting. Terms such as "upper", "lower", "above", and "below," refer to directions in the drawings to which reference is made. Terms such as "inwards" and "outward" refer to directions towards and away from, respectively, the geometric center of the component described. Terms such as "side", "top", "bottom," "horizontal," and "vertical," describe the orientation of portions of the component within a consistent but arbitrary frame of reference which is made clear by reference to the text and the associated drawings describing the component under discussion. Such terminology includes words specifically mentioned above, derivatives thereof, and words of similar import.

It will also be understood that, although the terms first, second, etc. may be used herein to describe various elements, these elements should not be limited by these terms. These terms are only used to distinguish one element from another. For example, a first member could be termed a second member, and, similarly, a second member could be termed a first member, without departing from the scope of the present invention.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed terms. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Referring to the Figures, wherein like numerals indicate corresponding parts throughout the several views, a case 10 for a mobile device 1 includes a housing 50; a first foldable panel 20 comprising a first speaker 21, pivotally connected to a first side 57 of the housing 50; a second foldable panel 30 comprising a second speaker 31 pivotally connected to a second side 58 of the housing 50; a power source 54; and a switch 60 are generally shown.

Figure 2:
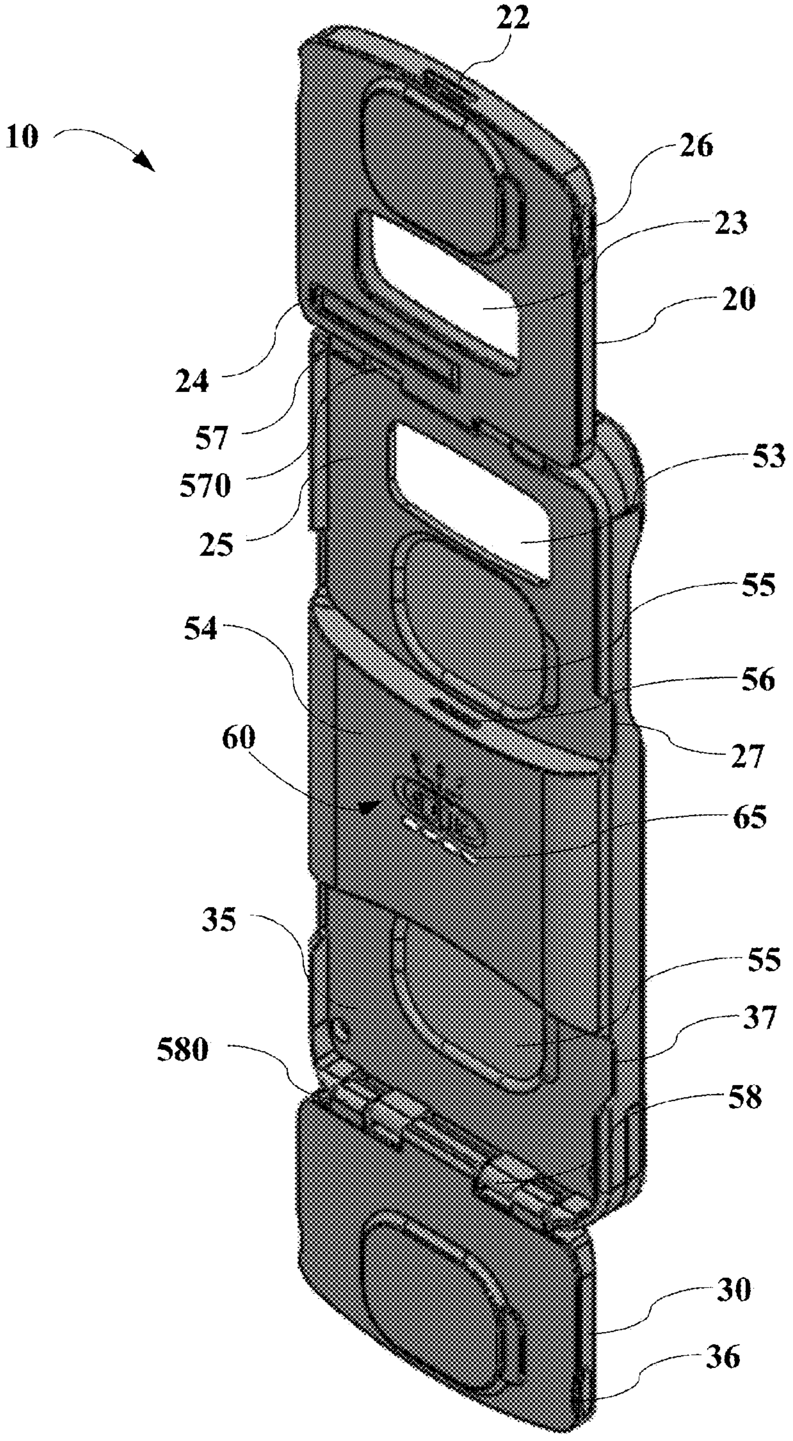
FIG. 2 is another perspective view of an embodiment of the present invention.
Figure 5:
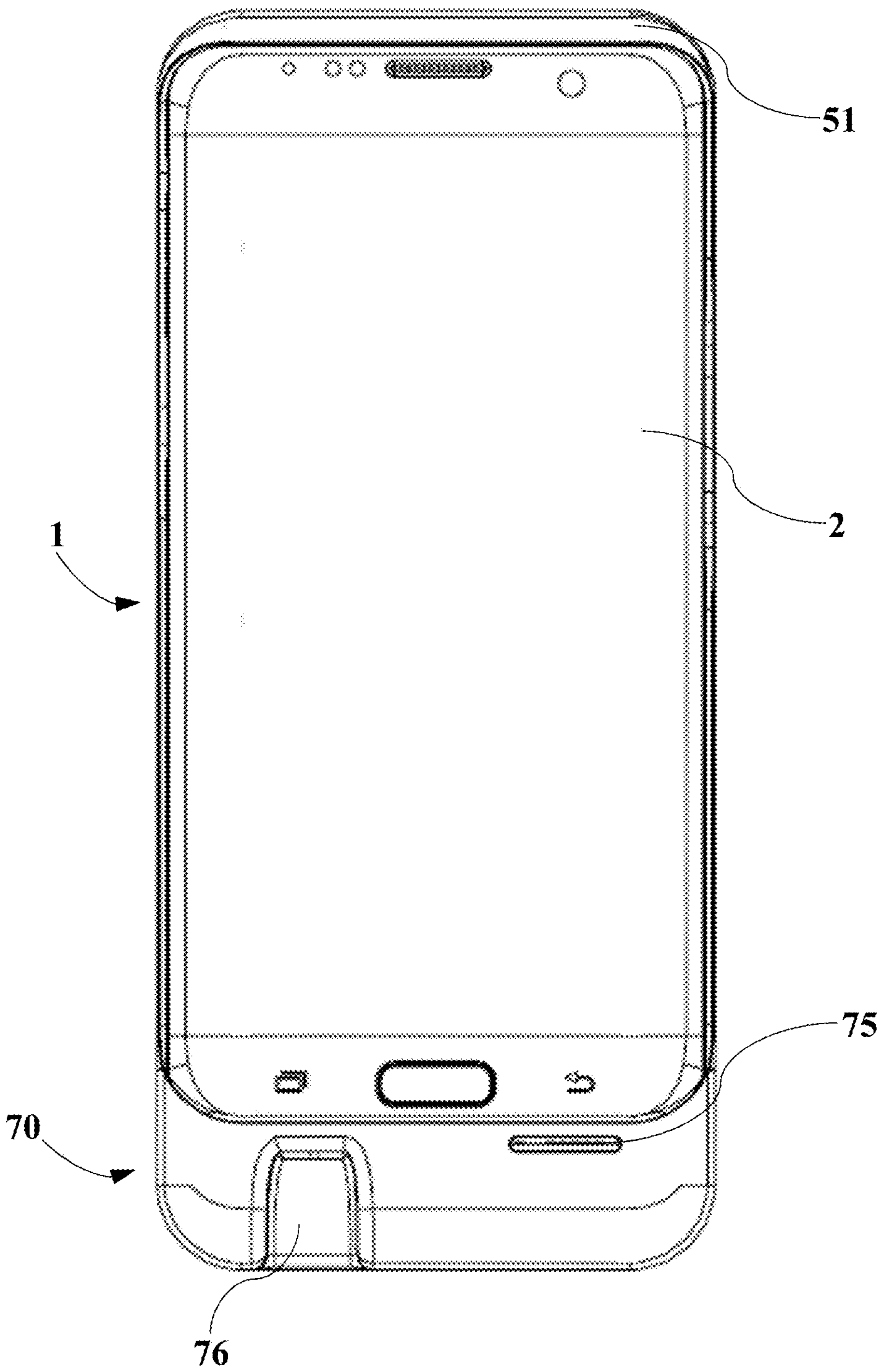
FIG. 5 is a side view when a mobile device is mounted in an embodiment of the present invention.
Figure 7:
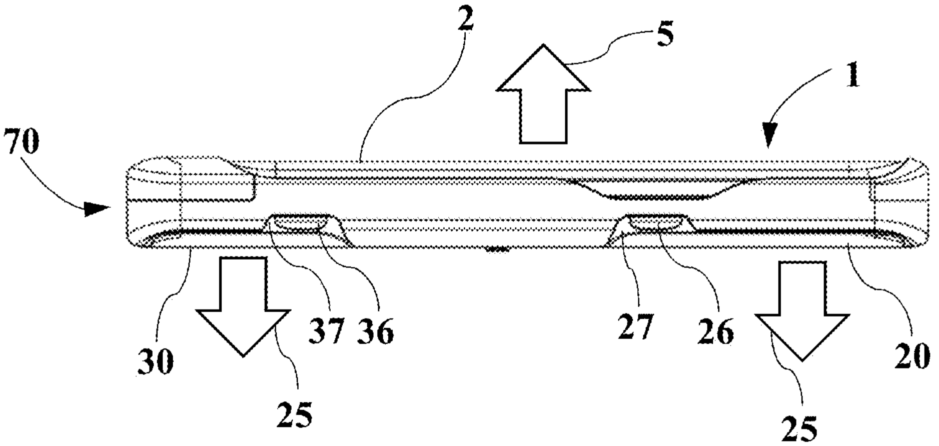
FIG. 7 is a different side view when the mobile device is mounted in an embodiment of the present invention.
Figure 8:
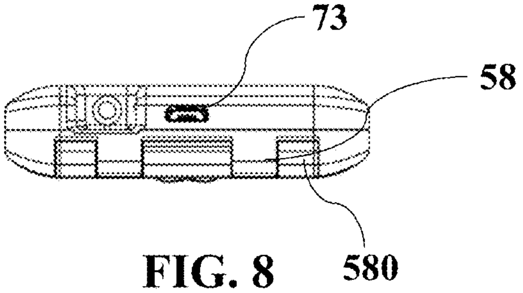
FIG. 8 is a different side view when the mobile device is mounted in an embodiment of the present invention.

As shown in FIGS. 1, 2, and 7, the housing 50 defines a cavity, a fastener 51, a connector 70, and a window 53. As shown in FIGS. 1 and 5, the cavity is configured to partially enclose a mobile device 1 having a display panel 2. A bottom surface 52 of the cavity is configured to meet an opposite surface of a display panel 2 of a mobile device 1. The mobile device 1 includes, but is not limited to, cellphones, smart phones, personal digital assistants (PDAs), portable media players (PMPs), mobile communication devices, handheld computing devices, ultra-mobile personal computers (UMPCs), and tablet computers. The mobile device 1 may have a display panel 2 and camera 3. However, it should be appreciated that the mobile device 1 may not have the display panel 1 or camera 3. Generally, a cell phone may fit within the cavity. However, cell phones may have different sizes, different shapes of buttons, and different positions of cameras and buttons. Thus, the size and shape of the cavity may vary and depend on the type of the mobile device 1. Generally, the cavity does not cover the buttons or camera 3 of the mobile device 1. However, even if the cavity covers the buttons, touch or pressure from outside of the cavity may be delivered to the buttons of the mobile device 1. For example, a material covering the buttons may be rubber. Thus, if a user presses part of the rubber, the pressure can be delivered to the button which meets the pressed part of the rubber of the cavity. The cavity may also have buttons immediately next to the buttons on the mobile device 1. Thus, if a user presses or touches buttons on the cavity, the buttons on the cavity transmit the pressure or touch to the buttons on the mobile device 1. Also, it should be appreciated that the mobile device 1 could be other devices such as, but not limited to, an audio player, smartphone, smart card, laptop, tablet computer, and personal navigation device. The cavity partially encloses the mobile device 1 to prevent the mobile device 1 from escaping the housing 50 of the case 10. However, the cavity does not block the display panel 2 of the mobile device 1. It should be appreciated that the display panel 2 could be, but is not limited to, liquid crystal display (LCD), light-emitting diode display (LED), organic light-emitting diode display (OLED), plasma, or text panel.

Figure 10:
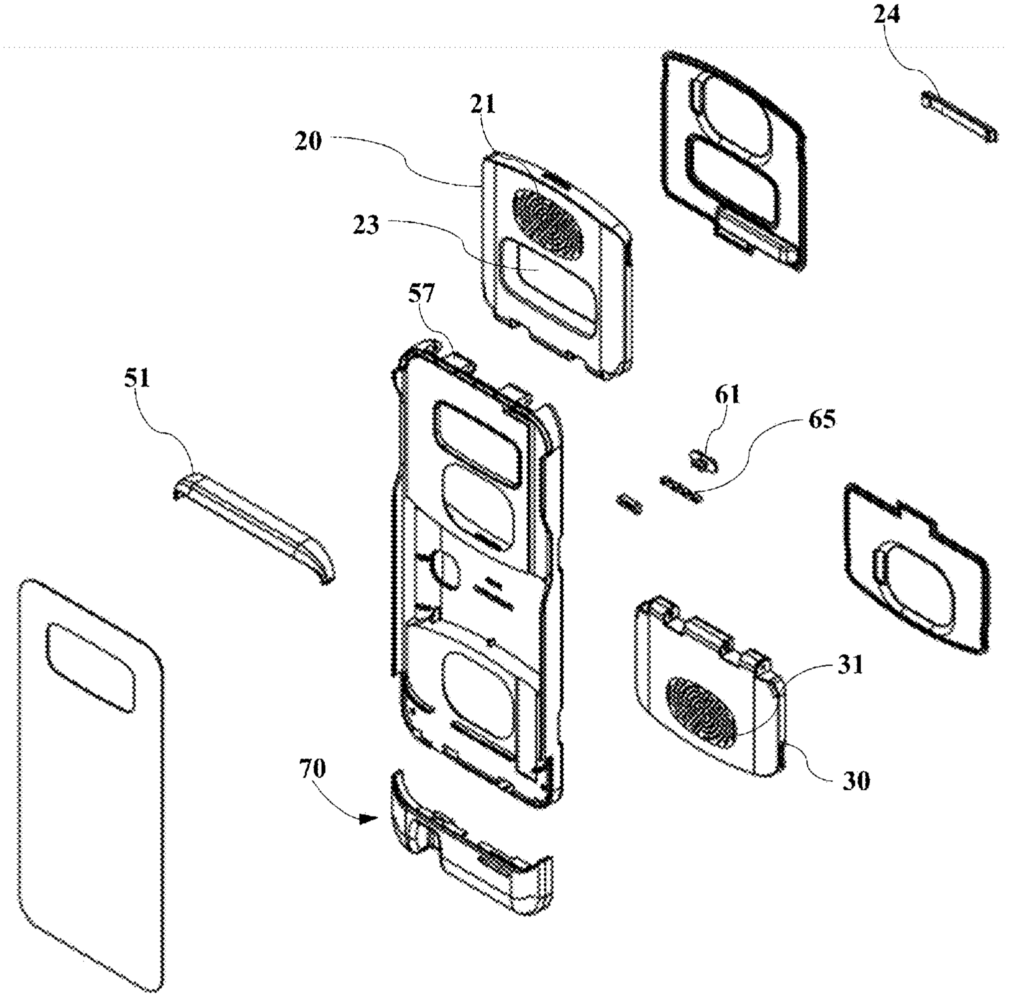
FIG. 10 is a perspective view of a dissembled embodiment of the present invention.

As shown in FIGS. 1, 5, and 10, the housing 50 includes a fastener 51 to fasten or fix the mobile device 1. The fastener 51 may be connected to, either integrally or as a separate component, the bottom surface 52 of the cavity at the end of one side of the housing. Generally, the fastener 51 holds a side of the mobile device 1. The fastener may, for example, hold a side of the mobile device 1, which has no charging port. The fastener 51 may partially or fully enclose the side of the mobile device 1 to prevent the mobile device 1 from escaping from the case 10.

The inside of the fastener 51 configured to meet the side of the mobile device 1 may have a flat or curved shape. Generally, the shape of the side of the mobile device 1 fits into the shape of the inside of the fastener 51. The exterior of the fastener 51 may have various shapes to protect the mobile device 1 or to add to the aesthetic of the case 10. The fastener 51 may be made of a flexible rubber that has sufficient flex to allow for the mobile device 1 to be placed within the cavity but also to be hard enough to hold the mobile device 1 within the cavity during ordinary use. Ordinary use includes, for example shaking and sometimes dropping the mobile device 1. The fastener 51 may also have a hinge between the fastener 51 and housing 50 to allow for the mobile device 1 to be smoothly placed within the cavity in a substantially parallel direction to the bottom surface 52 of the cavity. In such a case, the hinge is biased towards a closed position for securing the mobile device in place. The hinge can be urged open when it is desired to place the mobile device 1 within the cavity. It should be appreciated that the material of the fastener 51 may be other materials such as, but not limited to, plastic, polyurethane, polycarbonate, carbon fiber, wood, leather, metal, and silicone.

As shown in FIGS. 1, 4, 5, and 8, the housing 50 may include a connector 70. Generally, the connector 70 holds the side of the mobile device 1 opposite to the side that is held by fastener 51. The side of the mobile device 1 held by connector 70 may, for example, have a Universal Serial Bus (USB) receptacle. The connector 70 may be disposed on the bottom surface 52 of the cavity at the end of the other side of the housing. The connector 70 may partially or fully enclose the other side of the mobile device 1 to prevent the mobile device 1 from escaping from the case 10. The connector 70 may include a USB or other connection plug 72 for connecting the mobile device 1 with the connector 70. The plug 72 may be, but is not limited to, a USB plug such as Type-A, Type-A SuperSpeed, Type-B, Type-B SuperSpeed, Mini-A, Mini-B, Micro-A, Micro-B, Micro-B SuperSpeed, Type-C, HTC ExtMicro, Nokia Pop-Port, an Apple Lightning-to-Lightning plug or Apple Lightning-to-USB plug. The connector 70 may also include a receptacle 73 (e.g., a USB receptacle) to connect the connector 70 with an external plug 81 (e.g., external USB plug) for the mobile device 1 or the case 10 itself. The receptacle 73 may be, but is not limited to, a USB receptacle such as a Type-A, Type-A SuperSpeed, Type-B, Type-B SuperSpeed, Mini-A, Mini-B, Micro-A, Micro-B, Micro-B SuperSpeed, Type-C, HTC ExtMicro, Nokia Pop-Port, an Apple Lightning-to-Lighting receptacle or Apple Lightning-to-USB receptacle. However, it should be appreciated that the plug 72 and receptacle 73 could be any other types of communication/power transmitter for transmitting and receiving data and power to/from the mobile device 1 or case 10. If an external USB plug 81 is connected to the case 10, power is transmitted through the USB receptacle 73. The power may then be transmitted to a power source of the case 10 for storage, or may be transmitted through plug 72 to the mobile device 1. Power received through the receptacle 73 may also be transmitted to a power source 54 of the case 10 for storage and the mobile device 1 at the same time. When the case 10 is unplugged from the external plug 81, the power source 54 of case 10 may supply power to the mobile device 1.

The connector 70 may include a hole 75 for the microphone of the mobile device 1. The hole 75 allows sound from outside of the case 10 to reach the microphone of the mobile device 1. The case 10 itself may, or may not, have a microphone system. If the case 10 does not have a microphone system, the hole 75 is used to receive sound from outside of the case 10. The position of the hole 75 depends on the position of the microphone of the mobile device 1. Generally, the hole 75 is aligned with, or at least disposed close to, the position of the microphone of the mobile device 1. In another embodiment, the hole 75 may be omitted from the case 10, and the case 10 may instead include a microphone system, which may, for example, be housed within the connector 70. The case 10 may then use the microphone system to transmit sound outside of the case 10 to the mobile device 1. The microphone system may operate by wirelessly communicating with the mobile device 1 using the wireless communications system of the case 10 to wirelessly transmit the sound to the phone, or may operate through the plug 72.

The connector 70 may also include a space 76 for a 3.5 mm plug or phone jack. The space 76 for the 3.5 mm plug may be disposed in the connector 70 aligned with or close to the position of a 3.5 mm receptacle in the mobile device 1. However, if the 3.5 mm receptacle is disposed in the side of the mobile device 1 that is opposite to the connector 70, the space 76 for the 3.5 mm plug may be disposed in the fastener 51. Also, it should be appreciated that the space 76 for the 3.5 mm plug could be disposed in a different place in the housing 50 depending on the position of the 3.5 mm receptacle in the mobile device 1.

As shown in FIGS. 1, 2, 6, and 10, the housing 50 may include a window 53 to show the mobile devices 1 camera 3 or flash 4 that is located opposite to the display panel 2 of the mobile device 1. The window 53 may also show other parts of the mobile device 1. The first foldable panel 20 may also have another window 23 having a size similar to, or the same as, the size of the window 53. The window 23 allows the camera 3 or flash 4 to be seen when the foldable panel 20 is folded/closed over the window 53. In the embodiment shown in FIGS. 1, 2, 6 and 10, the windows 23 and 53 are not covered by any material. However, the windows 23 and 53 may be covered by, but not are limited to, a glass, acrylic sheet, or polycarbonate sheet, or transparent thermoplastic sheet.

Figure 3:
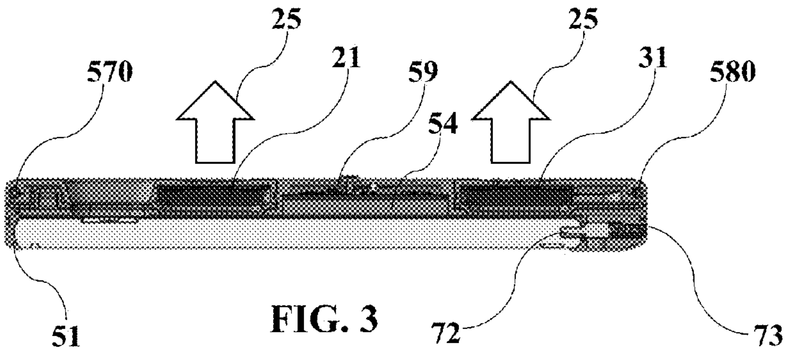
FIG. 3 is a cross-sectional view of an embodiment of the present invention when a foldable panel is folded.
Figure 4:
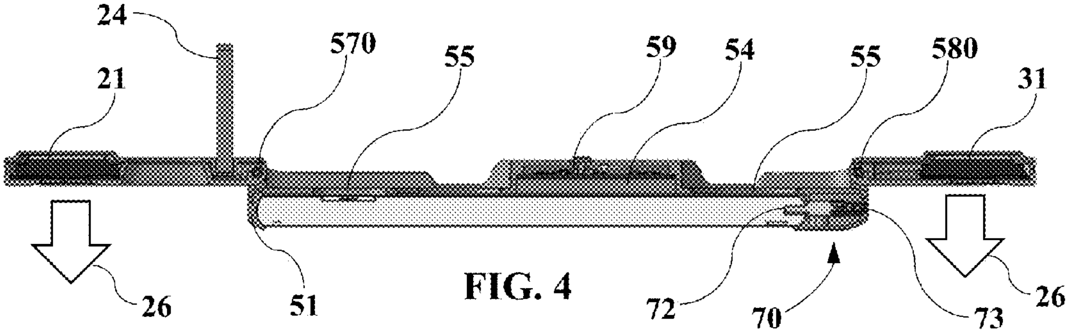
FIG. 4 is a cross-sectional view of an embodiment of the present invention when the foldable panel is unfolded.
Figure 6:
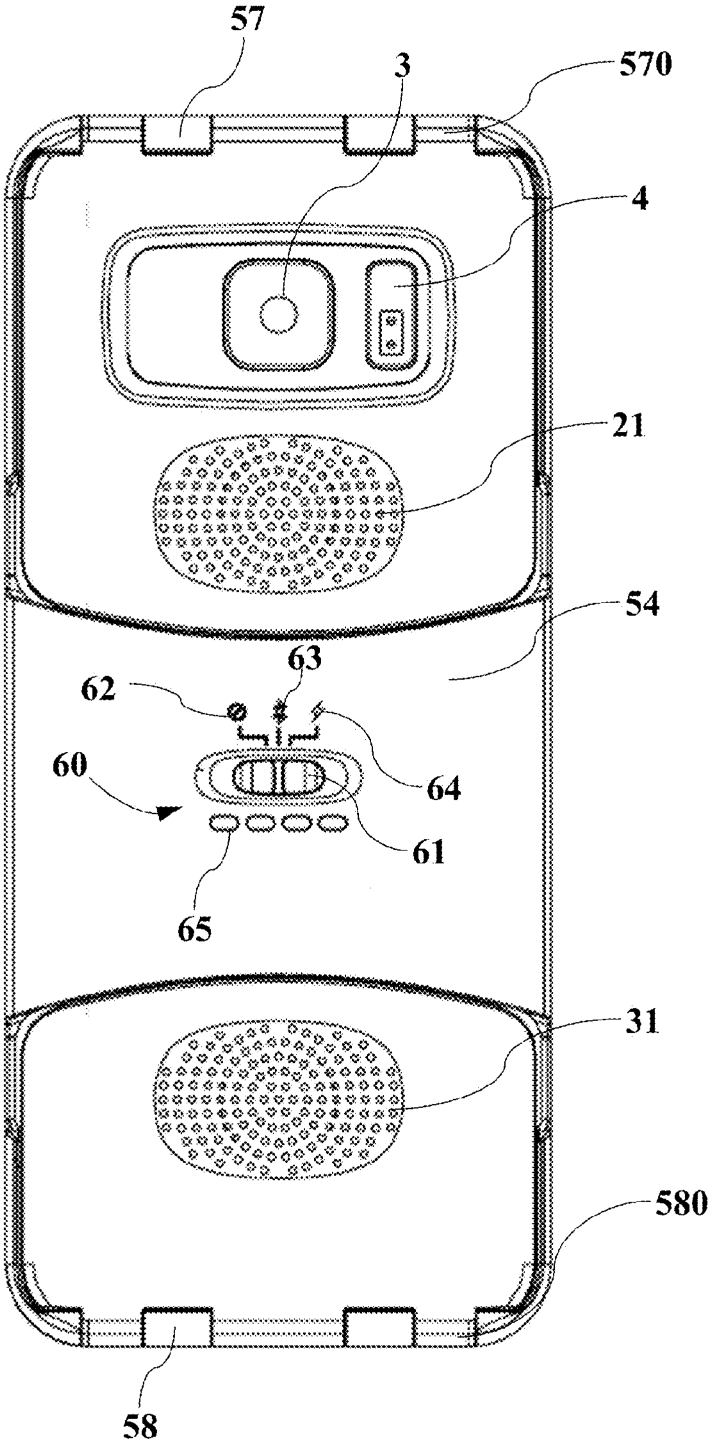
FIG. 6 is a different side view when the mobile device is mounted in an embodiment of the present invention.

FIGS. 1-2 and 4 show the case 10 when the first and second foldable panels 20 and 30 are in an unfolded position. FIGS. 3 and 6-7 show the first and second foldable panels 20 and 30 in a folded position. The first and second foldable panels 20 and 30 include first and second speakers 21 and 31, respectively. The housing 50 is connected to the two foldable panels 20 and 30. The two foldable panels 20 and 30 are foldable like double doors. However, it should be appreciated that the number of panels connected to the housing 50 may, for example be one instead of the two shown in these figures. The first foldable panel 20 is pivotally connected to a first side 57 of the housing 50. The first side 57 may be a side corresponding to or connected to the fastener 51. However, it should be appreciated that the first side 57 may also be the other side of the housing 50. The first side 57 of the housing 50 includes a hinge 570. The hinge 570 may have a digital pulse shape. The hinge 570 may be formed of three protruding portions on the first foldable panel 20 and three sinking portions on the first side 57 of the housing 50. However, it should be appreciated that the number of protruding portions on the first foldable panel 20 and sinking portions on the first side 57 of the housing 50 are not limited to three. It can be one, two, or more than three. The three protruding portions on the first foldable panel 20 fit into the three sinking portions on the first side 57 of the housing 50. Surfaces of three protruding portions on the first foldable panel 20, which meet the sinking portions, have small protruding portions to prevent the housing 50 from detaching from the first foldable panel 20 when the first foldable panel 20 rotates from a folded position to an unfolded position. Other surfaces of three sinking portions have small sinking portions into which the small protruding portions on the first foldable panel 20 fit. However, it should be appreciated that, to hold housing 50 and the first foldable panel 20, pins can be used to connect the three protruding portions on the first foldable panel 20 to the three sinking portions on the first side 57 of the housing 50. The pins may penetrate the three protruding portions on the first foldable panel 20 to be connected to the three sinking portions on the first side 57 of the housing 50. Also, other types of hinges include, but are not limited to, a butt hinge, T-hinge, strap hinge, Soss hinge, continuous hinge, cabinet hinge, and butterfly hinge in order to connect the first foldable panel 20 to the housing 50.

The first foldable panel 20 may rotate about the hinge axis relative to the back surface 25 of the bottom surface 52. Thus, the first foldable panel 20 may rotate from a folded position where the first foldable panel 20 may be folded on the back surface 25 of the bottom surface 52 of the cavity to an unfolded position where the first foldable panel 20 extends laterally relative to the bottom surface 52 of the cavity to be substantially parallel to the bottom surface. The first folded panel 20 does not block the display panel 2 and does not affect the visibility of the display panel 2. When the first foldable panel 20 is folded, the first foldable panel 20 may be locked using a small protruding part 56 in the housing 50 and a small sinking part 22 in the first foldable panel 20. The small protruding part 56 in the housing 50 fits into the small sinking part 22 in the first foldable panel 20 to prevent the first foldable panel 20 from unintentionally being unfolded. Unfolding the first foldable panel 20 requires a reasonable degree of force by the user, because the first foldable panel 20 is locked by the small protruding part 56 in the housing 50 and the small sinking part 22 in the first foldable panel 20. To easily unfold the first foldable panel 20, the first foldable panel 20 may have a dent 26. Generally, the first foldable panel 20 is partially enclosed in the housing 50. However, the housing 50 does not enclose the portion 27 of the first foldable panel 20 where the dent 26 is disposed. Thus, the user uses the dent 26 to unfold or open the first foldable panel 20. While rotating from the folded position to the unfolded position, the first foldable panel 20 may have four halts in 60, 90, 120, and 180 degrees relative to the back surface 25 of the bottom surface 52 of the cavity. However, it should be appreciated that the first foldable panel 20 may not have any halts or may have one, two or more than four halts at a variety of different angles. To make those halts, the hinge 57 may have different protrusions and sinks at different angles.

The first foldable panel 20 may include a kick stand 24 to support the case 10 in the unfolded position for the display panel 2 to stand at a 100 to 170 degree angle relative to the ground. The kick stand 24 may be placed in the first foldable panel 20 within the surface that meets the back surface 25 of the bottom surface 52 of the cavity when the first foldable panel 20 is closed. Thus, when the kick stand 24 is inside of the first foldable panel 20, the kick stand 24 does not affect the movability of the first foldable panel 20. The kick stand 24 has a rectangular elongated shape. However, it should be appreciated that the shape of the kick stand 24 may also be, but is not limited to, a circle elongated shape. One end of the kick stand 24 is pivotally fixed in the first foldable panel 20. The other end of the kick stand 24 meets the ground when the kick stand 24 is pulled out of the first foldable panel 20.

The second foldable panel 30 is pivotally connected to a second side 58 of the housing 50. The second side 58 may be a side connected to the connector 70. However, it should be appreciated that the second side 58 may be the other side of the housing 50. The second side 58 of the housing 50 includes another hinge 580. The hinge 580 may have a digital pulse shape. The hinge 580 may be made by three protruding portions on the second foldable panel 30 and three sinking portions on the second side 58 of the housing 50. However, it should be appreciated that the number of protruding portions on the second foldable panel 30 and sinking portions on the second side 58 of the housing 50 are not limited to three. It can be one, two, or more than three. The three protruding portions on the second foldable panel 30 fit into the three sinking portions on the second side 58 of the housing 50. The surfaces of the three protruding portions on the second foldable panel 30, which meet the sinking portions, have small protruding portions to prevent the housing 50 from detaching from the second foldable panel 30 when the second foldable panel 30 rotates from a folded position to an unfolded position. Other surfaces of three sinking portions have small sinking portions into which the small protruding portions on the second foldable panel 30 fit. However, it should be appreciated that, to hold housing 50 and the second foldable panel 30, pins can be used to connect the three protruding portions on the second foldable panel 30 to the three sinking portions on the second side 58 of the housing 50. The pins may penetrate the three protruding portions on the second foldable panel 30 to be connected to the three sinking portions on the second side 58 of the housing 50. Also, other types of hinges include, but are not limited to, a butt hinge, T-hinge, strap hinge, Soss hinge, continuous hinge, cabinet hinge, and butterfly hinge and can be used to connect the second foldable panel 30 to the housing 50.

The second foldable panel 30 may also rotate about the hinge axis from substantially 0 to 180 degrees relative to the back surface 25 of the bottom surface 52. Thus, the second foldable panel 30 may rotate from a folded position where the second foldable panel 30 may be folded on the back surface 25 of the bottom surface 52 of the cavity to an unfolded position where the second foldable panel 30 may extend laterally in a parallel way relative to the bottom surface 52 of the cavity. The second foldable panel 30 does not block the display panel 2 and does not affect the visibility of the user. When the second foldable panel 30 is folded, the second foldable panel 30 may be locked using another small protruding part in the housing 50 and another small sinking part in the second foldable panel 30. Another small protruding part in the housing 50 fits into another small sinking part in the second foldable panel 30 to prevent the second foldable panel 30 from unintentionally being unfolded. Unfolding the second foldable panel 30 requires a reasonable degree of force by the user, because the second foldable panel 30 is locked by another small protruding part in the housing 50 and another small sinking part in the second foldable panel 30. To easily unfold the second foldable panel 30, the second foldable panel 30 may have another dent 36. Generally, the second foldable panel 30 is partially enclosed in the housing 50. However, the housing 50 does not enclose the portion 37 of the second foldable panel 30 where the dent 36 is disposed. Thus, the user uses the dent 36 to unfold or open the second foldable panel 30. While rotating from the folded position to the unfolded position, the second foldable panel 30 may have three halts at 60, 90, 120, and 180 degrees relative to the back surface 25 of the bottom surface 52. However, it should be appreciated that the second foldable panel 30 may not have any halts or may have one, two or more than four halts at a variety of different angles. To make those halts, the hinge 580 may have different protrusions and sinks in different angles.

The first and second foldable panels 20 and 30 may include first and second speakers 21 and 31, respectively. In the folded position, the first and second speakers 21 and 31 face in a direction that is opposite to the opening of the cavity. In other words, the speakers face in a direction 25 opposite to the direction 5 that the display panel 2 faces. In the unfolded position, the first and second speakers 21 and 31 face in a parallel direction 26 to the direction that the display panel 2 faces. Thus, the user may enjoy a video or movie while the first and second speakers 21 and 31 are disposed adjacent to the display panel 2 in the unfolded position. To provide a sufficient space for the first and second speakers 21 and 31, the back surfaces 25 and 35 of the bottom surface 52 of the cavity may provide extra spaces or extra dents 55 for the first and second speakers 21 and 31 in the folded position. The first and second speakers 21 and 31 are controlled by a processor 59 placed in the housing 50. Through the processor 59, the mobile device 1 may output sound through the first and second speakers 21 and 31 using wireless communication by way of the wireless communication system. The wireless communication system may include a Bluetooth module 92 for connecting with the mobile device 1 using Bluetooth communication. Because the mobile device 1 can communication wirelessly with the case 10, the case 10 may be used to output sound even when the mobile device 1 is separated from the case 10.

As shown in FIGS. 2-4, 6, and 9, the case 10 may include a power source 54 disposed on the back surface 25 and 35 of the bottom surface 52 of the cavity. The power source 54 may be placed between the first and second foldable panels 20 and 30 in the folded position. However, it should be appreciated that the position of the power source 54 is not limited to be disposed on the back surface 25 and 35 between the first and second foldable panels 20 and 30. The power source 54 may be disposed in any place in the case 10. In an embodiment, the power source 54 may be a part of the housing 50. Although the power source 54 may not be replaceable in this case, the overall size of the housing 50 can be reduced. However, the power source 54 may also be designed to be detachable from the housing 50. The user may replace the power source 54 with another power source when the lifespan of the power source 54 has reached its limit or when it is hard to find a place to charge the power source 54. The power source 54 may be charged through the external plug 81 connected to the receptacle 73 of the connector 70. The external plug 81 and receptacle 73 may be, but are not limited to, USB such as Type-A, Type-A SuperSpeed, Type-B, Type-B SuperSpeed, Mini-A, Mini-B, Micro-A, Micro-B, Micro-B SuperSpeed, Type-C, HTC ExtMicro, Nokia Pop-Port, an Apple Lightning-to-Lighting or Apple Lightning-to-USB. The power source 54 may provide power to the processor 59 to operate the first and second speakers 21 and 31. The power source 54 may also provide power to the mobile device 1 when the mobile device 1 does not have sufficient power. The type of power source 54 may be a lithium Ion battery, a lithium polymer battery, a nickel cadmium battery, nickel metal hydride battery, or a battery using new lithium technology. However, it should be appreciated that the power source 54 may be any other type to store and provide power to the mobile device 1, the processor 59, and the first and second speakers 21 and 31.

Figure 9:
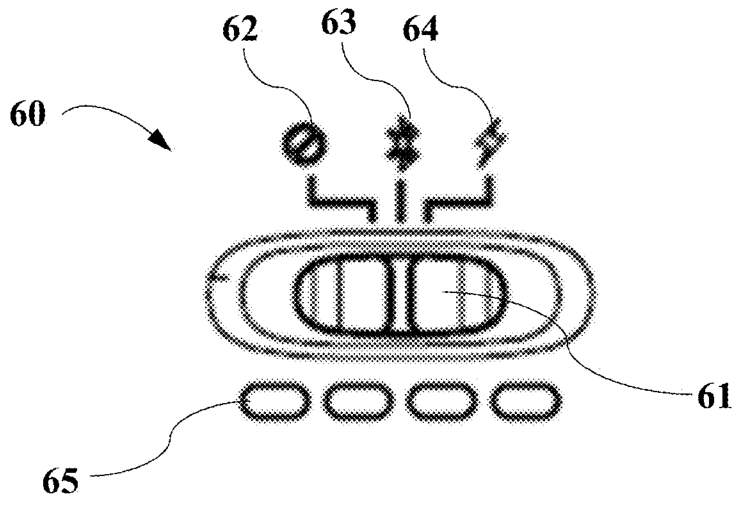
FIG. 9 is a side view of a switch of an embodiment of the present invention.

As shown FIGS. 2, 6, and 9, the case 10 may include a light source 65 to indicate the remaining amount of power in the power source 54. The light source 65 may be placed on the power source 54. However, it should be appreciated that the position of the light source 65 may be a different place in the case 10 where the light source 65 allows the user to easily assess the remaining power of the power source 54. The light source 65 may be covered by a transparent or translucent material to soften the light of the light source 65. The light source 65 may be a light emitting diode (LED). However, the light source 65 may be any other type of technology to illuminate the transparent or translucent cover to show the status of the remaining power of the power source 54. The number of the light source 65 may be four indicating four levels of remaining power of the power source 54. For example, if four light sources 65 are illuminated, the power source 54 is fully charged. On the other hand, if one or zero light source 65 are lit up, the power source 54 needs to be charged. If the power source 54 is almost out of power, four light sources 65 may begin blinking. However, it should be appreciated that the manner in which the remaining power of the power source 54 is displayed may be changed. Also, it should be appreciated that the number of the light source 65 can be different. For example, it can be two, three, or more than four. The light source 65 may be one elongated bar showing the remaining power as color or shade.

Figure 11:
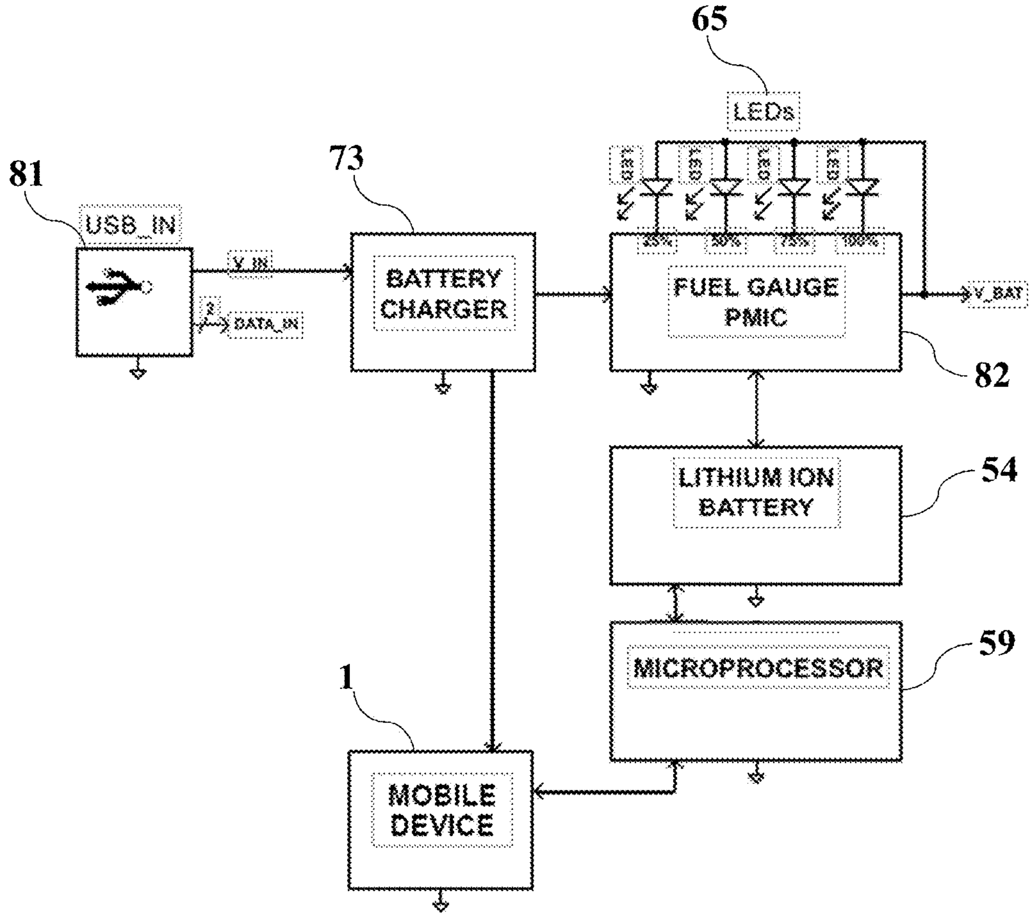
FIG. 11 is a schematic diagram of charging circuitry of an embodiment of the present invention.
Figure 12:
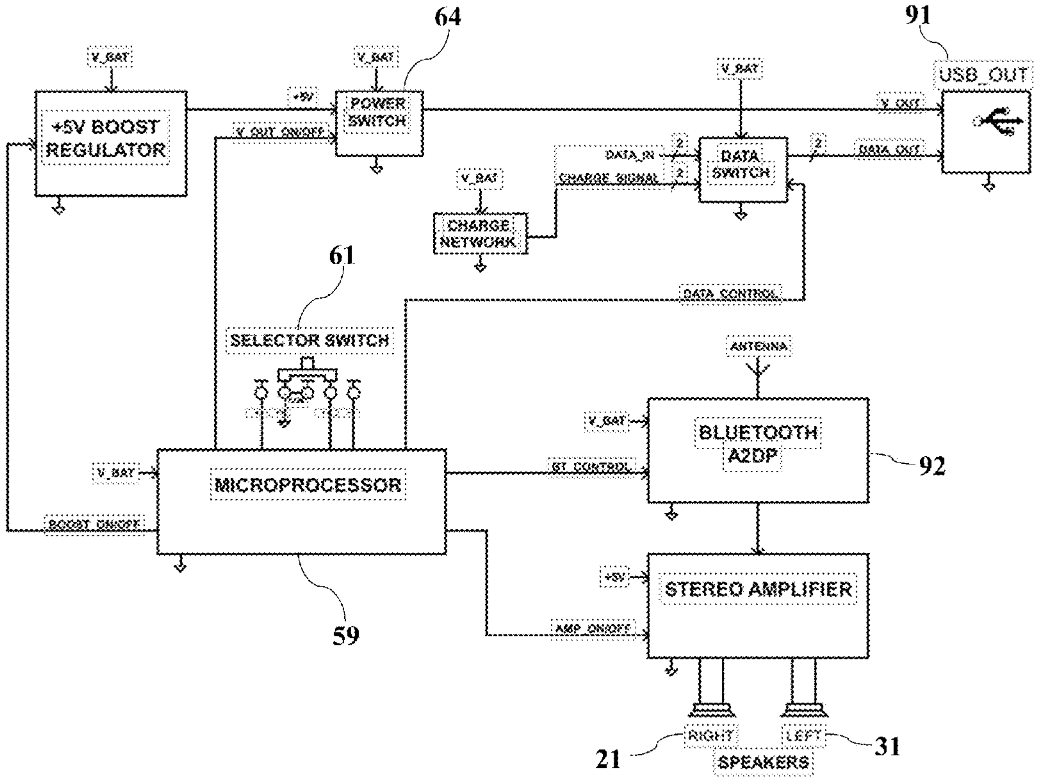
FIG. 12 is a schematic diagram for circuitry for communications between a microprocessor and other parts of an embodiment of the present invention.

As shown in FIG. 11, the external USB plug 81 is connected to a battery charger 73. The power to the external USB plug 81 may be from a general-purpose alternating-current (AC) electric power supply having a voltage in the range of 100-240V (root-mean-square voltage). The power from the AC electric power supply may be converted to direct current (DC) prior to reaching the USB plug 81. However, it should be appreciated that the power to the external USB plug 81 may also be provided directly from a direct current (DC) electric power source. The power from the external USB plug 81 may provide power to the mobile device 1 and the power source 54 of the case 10 at the same time. The power may pass through a fuel gauge power management integrated circuit (PMIC) 82 before reaching the power source 54. The fuel gauge PMIC 82 measures the state of charge or the remaining power of the power source 54. The state of charge or the remaining power of the power source 54 may be indicated by the light source 65. Power charged in the power source 54 may be transmitted to the mobile device 1. The transmission of the power from the power source 54 to the mobile device 1 is controlled by the processor 59 using the switch 60.

As shown in FIGS. 2, 6, and 9, the case 10 may include a switch 60 to control the case 10. The switch 60 may be disposed on the power source 54 for the user to control the case 10 in a convenient way. However, the switch 60 may be disposed on any place in the housing 50, the first foldable panel 20, or second foldable panel 30. The switch 60 has three modes: power off 62, wireless communications 63, and power transfer mode 64. The power off mode 62 may turn off the power of the case 10. The wireless communications mode 63 turns on wireless communications between the microprocessor 59 and the mobile device 1 so that sound may be output from the speakers 21 and 31 using wireless communication. The case 10 may employ a wireless communication system including a Bluetooth module 92 to accomplish the wireless communication. However, it should be understood that the wireless communication may use various technologies including, but not limited to, Bluetooth, near field communication (NFC), Zigbee, Z-Wave, 6LowPAN, Thread, Sigfox, Wi-Fi, or infrared communication. Also, it should be appreciated that the wireless communication is not limited to communications between the case 10 and the mobile device 1. The wireless communication may be possible between the first and second speakers 21 and 31 and any device that is able to communicate with the wireless communication technology the case 10 utilizes. For example, a user may play a song saved in the user's laptop and listen to the song using the first and second speakers 21 and 31 in the case 10. In this case, although the laptop is detached from the case 10, the laptop has wireless communications capabilities to communicate with the the wireless communication system of the case 10. Thus, the first and second speakers 21 and 31 in the case 10 may output the sound of the song using the same wireless communication technology. The power transfer mode 64 transfers power from the power source 54 to the mobile device 1. The mode change may be manually achieved by a small switch bar 61. The small switch bar 61 may have one or more protruding portions and one or more sinking portions used when the user slides the small switch bar 61. In an alternative embodiment, the mode change may be controlled by a touch switch on the housing 50. Accordingly, the user may change one of the modes by touching a predetermined area on the housing 50. The type of the touch switch may be, but is not limited to, a capacitance switch, a resistance touch switch, or a Piezo touch switch. If the case 10 has a touch switch, the modes that can be controlled by the touch switch may be the wireless communication mode 63 and the power transfer mode 64 to reduce power consumption by the touch switch. In that case, the power off mode 62 may be controlled by another switch bar. The mode change also may be achieved by the mobile device 1 using a mobile device software application installed in the mobile device 1. However, it should be appreciated that the switch 60 is not limited to the small switch bar 61, the touch switch, or the mobile application. The switch 60 may use any other types of technology to allow the user to change the modes of the case 10.

As shown in FIG. 10, the switch 60 may be connected to the processor 59. The processor 59 may be disposed on or below the power source 54. However, it should be appreciated that the processor 59 may be disposed in any place in the housing 50. The processor 59 may control the operation of the case 10. The processor 59 may control the wireless communications operation 92 including turning on the wireless communications function, connecting the first and second speakers 21 and 31 to the mobile device 1, receiving data from the mobile device 1, and transmitting sound data to the first and second speakers 21 and 31. The processor 59 also controls the power of the power source 54 to transfer the power to the mobile device 1.

The foregoing description, for purpose of explanation, has been described with reference to specific embodiments.

However, the illustrative discussion above is not intended to be exhaustive or to limit the invention to the precise forms disclosed. Many modifications and variations are possible in view of the above teachings. The embodiments were chosen and described in order to explain the principle of the invention and some of its practical applications, to thereby enable others skill in the art to best utilize the invention and various embodiments with various modifications as are suited to the particular use contemplated.

The invention claimed is:

1. A case for a mobile device comprising:

a housing comprising a first cavity configured such that the mobile device is capable of being partially enclosed therein, a second cavity and a third cavity, wherein said first cavity has a bottom surface and an opening, and said second and third cavities are disposed on a back surface of the housing that is opposite to said bottom surface of said first cavity, such that openings of the second and third cavity face in an opposite direction from the opening of the first cavity;

a first foldable panel configured to be partially enclosed in said second cavity and comprising a first speaker, the first foldable panel being pivotally connected to a first side of said housing; and a second foldable panel configured to be partially enclosed in said third cavity and comprising a second speaker, the second foldable panel being pivotally connected to a second side of said housing, wherein said first and second foldable panels rotate from a folded position where said first and second foldable panels are configured to be folded within the second cavity and the third cavity, respectively, such that the first foldable panel is partially enclosed in the second cavity and the second foldable panel is partially enclosed in the third cavity and said first and second speakers face in a direction from said bottom surface of said first cavity to said opening of said first cavity to an unfolded position where said first and second foldable panels extend laterally away from said back surface of said bottom surface of said first cavity.

2. The case for a mobile device of claim 1, wherein the housing further comprises a raised portion interposed between the second cavity and the third cavity, the raised portion having a height that is substantially the same as a thickness of said first and second foldable panels, such that surfaces of the first and second foldable panels and the raised portion are flush when the first and second foldable panels are in the folded position, wherein the raised portion houses a power source.

3. The case for a mobile device of claim 2, wherein said power source is configured to be disposed between said first and second foldable panels in said folded position.

4. The case for a mobile device of claim 2, wherein said housing further comprises a light source configured to indicate remaining power of said power source.

5. The case for a mobile device of claim 2, wherein said first and second speakers communicate with said mobile device through wireless communications.

6. The case for a mobile device of claim 5, further comprising a switch disposed on said power source, wherein said switch includes three modes: power off, wireless communication, and power transfer, wherein said off mode turns off power of said case, said wireless communication mode turns on wireless communications between said first and second speakers and said mobile device, and said power transfer mode provides power of said power source to said mobile device.

7. The case for a mobile device of claim 2, wherein said housing further comprises a connector disposed on a side of said first cavity and configured to fasten said mobile device and connect an external communication plug to said mobile device.

8. The case for a mobile device of claim 7, wherein said connector is connected to said power source and configured to transmit power to said mobile device and said power source at the same time.

9. The case for a mobile device of claim 7, wherein said connector comprises a hole for a microphone in said mobile device, configured to deliver sound outside of said case to said microphone in said mobile device.

10. The case for a mobile device of claim 7, wherein said connector comprises a microphone configured to transmit sound outside of said case to said mobile device.

11. The case for a mobile device of claim 1, wherein said housing further comprises a fastener disposed on a side of said first cavity and configured to fasten said mobile device.

12. The case for a mobile device of claim 1, wherein said first foldable panel includes a kick stand configured to support said case in said unfolded position where said display panel stands at a 100 to 160 degree angle relative to the ground.

13. The case for a mobile device of claim 1, wherein said housing and said first foldable panel have a window configured to show a camera or a display on a back surface of said display panel.

14. A case for a mobile device comprising:

a housing comprising a first cavity configured such that the mobile device is capable of being partially enclosed therein, and at least one second cavity, wherein said first cavity includes a bottom surface and an opening, said at least one second cavity is disposed on a back surface of the housing that is opposite to said bottom surface of said first cavity such that an opening of the at least one second cavity faces in an opposite direction from the opening of the first cavity, and said housing includes at least one side having a hinge axis;

at least one foldable panel configured to be partially enclosed in said at least one second cavity and comprising a speaker, the at least one foldable panel being pivotally connected to said at least one side of said housing, wherein said at least one foldable panel is configured to rotate about said hinge axis relative to the back surface; and a raised portion formed on the back surface so as to define the second cavity, the raised portion having a height that is substantially the same as a thickness of said at least one foldable panel, such that surfaces of the at least one foldable panel and the raised portion are flush when the at least one foldable panel is partially enclosed in the at least one second cavity, wherein said at least one foldable panel rotates from a folded position where said at least one foldable panel is configured to be folded within said at least one second cavity such that said at least one foldable panel is partially enclosed in said second cavity and said speaker faces in a direction from said bottom surface of said first cavity to said opening of said first cavity to an unfolded position where said at least one foldable panel extends laterally away from said back surface of said bottom surface of said first cavity and said speaker faces in a direction away from the direction from said bottom surface of said first cavity to said opening of said first cavity.

15. The case for a mobile device of claim 14, wherein said speaker communicates with said mobile device through wireless communications.

16. The case for a mobile device of claim 15 further comprising a switch disposed on said power source, wherein said switch includes three modes: off, communication, and power, wherein said off mode turns off power of said case, said communication mode turns on said wireless communications between said speaker and said mobile device, and said power mode provides power of said power source to said mobile device.

17. The case for a mobile device of claim 14, wherein said housing further comprises a fastener disposed on a side of said first cavity and configured to fasten said mobile device.

18. The case for a mobile device of claim 14, wherein said housing further comprises a connector disposed on a side of said first cavity and configured to fasten said mobile device and connect an external communication plug to said mobile device.

19. The case for a mobile device of claim 18, wherein said connector is connected to said power source and configured to transmit power to said mobile device and said power source at the same time.

* * * * *